United States Patent
Chow et al.

(10) Patent No.: US 8,185,715 B1
(45) Date of Patent: May 22, 2012

(54) METHOD AND SYSTEM FOR MANAGING METADATA IN STORAGE VIRTUALIZATION ENVIRONMENT

(75) Inventors: William W. Chow, Los Angeles, CA (US); John Logan, Long Beach, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 650 days.

(21) Appl. No.: 11/694,698

(22) Filed: Mar. 30, 2007

(51) Int. Cl.
*G06F 12/00* (2006.01)

(52) U.S. Cl. .................................. 711/170; 711/154

(58) Field of Classification Search .............. 711/170, 711/154
See application file for complete search history.

(56) References Cited

U.S. PATENT DOCUMENTS

| | | | |
|---|---|---|---|
| 2002/0049731 A1* | 4/2002 | Kotani | 707/1 |
| 2002/0059309 A1* | 5/2002 | Loy et al. | 707/200 |
| 2002/0184463 A1* | 12/2002 | Arakawa et al. | 711/170 |
| 2003/0028514 A1* | 2/2003 | Lord et al. | 707/1 |
| 2007/0055702 A1* | 3/2007 | Fridella et al. | 707/200 |

\* cited by examiner

*Primary Examiner* — Jared Rutz
*Assistant Examiner* — Larry Mackall
(74) *Attorney, Agent, or Firm* — Klein, O'Neill & Singh, LLP (57) ABSTRACT

Method and system for managing metadata for a plurality of storage platforms that provide virtualization services is provided. The method includes requesting a memory chunk for storing metadata; wherein a data processing agent operating in a storage platform requests the memory chunk and a centralized metadata controller for the plurality of storage platforms receives the request for the memory chunk; determining the memory chunk size and allocating the memory chunk from a pool of memory chunks; and assigning the allocated memory chunk to a virtualization mapping object.

12 Claims, 6 Drawing Sheets

METHOD AND SYSTEM FOR MANAGING METADATA IN STORAGE VIRTUALIZATION ENVIRONMENT

BACKGROUND

1. Field of the Invention

The present invention relates to storage systems, and more particularly, to managing metadata.

2. Background of the Invention

Storage area networks ("SANs") are commonly used where plural storage devices are made available to various host computing systems. Data in a SAN is typically moved between plural host systems (that include computer systems, servers etc.) and storage systems through various controllers/adapters and switches.

Storage virtualization is desirable in SAN communication. The term storage virtualization as used herein means the process by which a logical (virtual) storage device/system/array appears to a host system as being a physical device (or a local device). Storage virtualization allows data to be stored in different storage arrays and devices, but can be presented to a host system in a comprehensive manner, as if the arrays and storage devices were local to the host system.

SAN-based storage virtualization attempts to provide scalable volume management, data replication, data protection, and data migration services. A common problem encountered when implementing these systems is that of storing and maintaining persistent information (which includes, commands, data and metadata) used by these services. The term persistent information as used herein means information that is saved and is available for future use (for example, in a hard drive, tape drive and others).

Persistent information includes mapping metadata and copy of the data stored by the host system. The term metadata as used throughout this specification includes information that describes data. For example, in file systems, file metadata includes, file name, time of creation and modification, read and write permissions and lists of block addresses at which the file's data is stored. For virtualization, storage metadata includes the mapping tables that link virtual block addresses to logical block addresses of physical storage devices.

Conventional approach makes a single network node (within a distributed network environment) responsible for allocating persistent storage and storing the virtualization metadata. This approach is undesirable for storing metadata that changes dynamically during various operations, for example, snapshots, point-in-time copy, journaling, and mirroring services because the network node responsible for allocating and storing the data becomes a bottleneck for the entire distributed system. Traditional approaches also use independent mechanisms for storing different types for virtualization metadata. For example, the mechanism for allocating and storing snapshot-related metadata differs from the method for allocating and storing dirty region logs for mirroring operations. These methods may in turn differ from the method for allocating and storing journaling data and metadata.

Therefore, there is a need for a method and system for efficiently managing metadata.

SUMMARY

In one embodiment, a method for managing metadata for a plurality of storage platforms that provide virtualization services is provided. The method includes requesting a memory chunk for storing metadata; wherein a data processing agent operating in a storage platform requests the memory chunk and a centralized metadata controller for the plurality of storage platforms receives the request for the memory chunk; determining the memory chunk size and allocating the memory chunk from a pool of memory chunks; and assigning the allocated memory chunk to a virtualization mapping object.

In another embodiment, a storage area network (SAN) is provided. The SAN includes a plurality of virtualization modules that are coupled together in a cluster; wherein each virtualization module runs a data processing agent for providing virtualization services and a centralized metadata controller for the cluster controls allocation of memory chunks to store metadata; and the metadata controller receives a request for a memory chunk from the data processing agent and determines the memory chunk size and allocates the memory chunk from a pool of memory chunks; and assigns the allocated memory chunk to a virtualization mapping object.

In yet another embodiment, a virtualization module coupled to other virtualization modules in a cluster is provided. The virtualization module includes a data processing agent for providing virtualization services; and a centralized metadata controller for the cluster that controls allocation of memory chunks to store metadata; and the metadata controller receives a request for a memory chunk from the data processing agent and determines the memory chunk size and allocates the memory chunk from a pool of memory chunks; and assigns the allocated memory chunk to a virtualization mapping object.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the invention. The drawings include the following Figures.

DETAILED DESCRIPTION

To facilitate an understanding of the various embodiments, the general architecture and operation of a network system will be described. The specific architecture and operation of the preferred embodiment will then be described with reference to the general architecture of the Fibre Channel system.

Figure 1A:
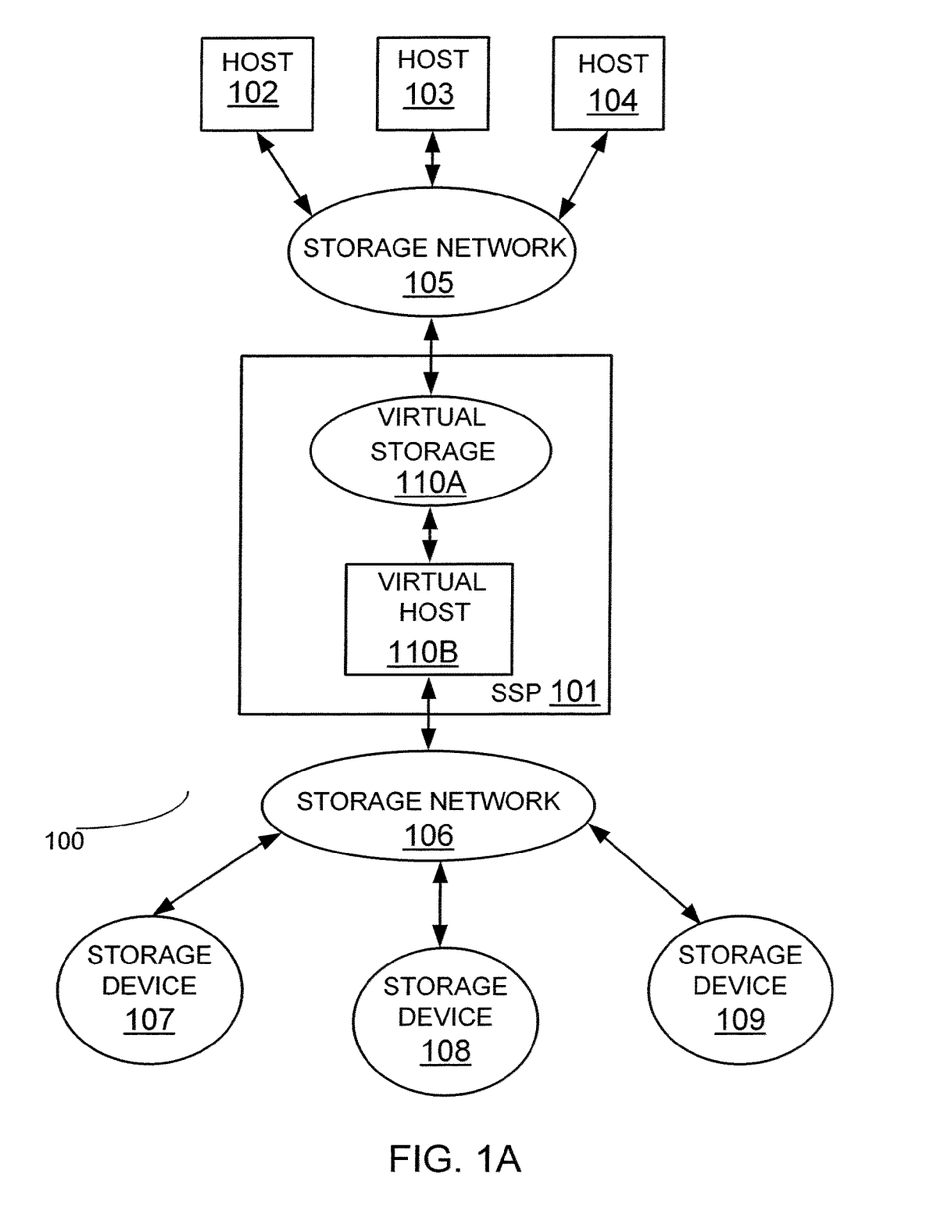
FIG. 1A shows a block diagram illustrating a networking system using virtualization.

FIG. 1A shows a top-level block diagram of a system 100 according to one aspect of the present invention. System 100 facilitates communication between plural devices/computing systems. Any device in network system 100 (for example, a Fibre Channel switch or node) can be used to connect plural host systems to plural storage devices. Furthermore, these elements in the network may also perform storage virtualization functions.

Various standards protocols may be used for designing and operating SANs. For example, network nodes in a SAN communicate using a storage protocol that operates on logical blocks of data, such as small computer system interface (SCSI). The SCSI protocol is incorporated herein by reference in its entirety. The storage protocol is delivered, by mapping or encapsulation, using a reliable transport protocol. Fibre Channel is one such standard transport protocol, which is incorporated herein by reference in its entirety.

Fibre channel is a set of American National Standard Institute (ANSI) standards, which provide a serial transmission protocol for storage and network protocols such as HIPPI, SCSI, IP, ATM and others. The Fibre Channel Protocol (FCP) maps SCSI commands to the Fibre Channel transport protocol. Other transport protocols may also support SCSI commands, for example, the SCSI parallel bus, Serial Attached SCSI, TCP/IP, and Infiniband. These standard protocols are incorporated herein by reference in their entirety.

It is noteworthy that although the adaptive aspects of the present invention have been described below with respect to Fibre Channel and SCSI protocols, the present invention is not limited to any particular protocol or standard.

Fibre channel supports three different topologies: point-to-point, arbitrated loop and Fibre Channel Fabric. The point-to-point topology attaches two devices directly. The arbitrated loop topology attaches devices in a loop. The Fibre Channel Fabric topology attaches devices (i.e., host or storage systems) directly to a Fabric, which may consist of multiple Fabric elements.

A Fibre Channel switch device is a multi-port device where each port manages routing of network traffic between its attached systems and other systems that may be attached to other switches in the Fabric. Each port can be attached to a server, peripheral, I/O subsystem, bridge, hub, router, or another switch.

Referring back to FIG. 1A, system 100 includes a plurality of host computing systems (102-104) that are coupled to a storage services platform (SSP) (also referred to as a "node" or "network node") 101 via SAN 105. Host systems (102-104) typically include several functional components. These components may include a central processing unit (CPU), main memory, input/output ("I/O") devices, and local storage devices (for example, internal disk drives). The main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

SSP (virtualization module) 101 is coupled to SAN 106 that is operationally coupled to plural storage devices, for example, 107, 108 and 109. SSP 101 provides virtual storage 110A to host systems 102-104, while operating as a virtual host 110B to storage devices 107-109. Virtual storage 110A includes a set of disk blocks presented to a host operating system as a range of consecutively numbered logical blocks with physical disk-like storage and SCSI (or any other protocol based) input/output semantics.

The devices of FIG. 1A are operationally coupled via "links" or "paths". A path may be established between two N ports. A packet-switched path may be established using multiple links, e.g. an N_Port (for example, virtual host 110B) may establish a path with another N_port (for example, storage devices 107-109) via one or more Fabric elements within SAN 106.

In one aspect, SSP 101 is a multi-port Fabric element in the SAN (e.g., in Fibre Channel, physical ports function as Fx_Ports). As a Fabric element, SSP 101 can process non-blocking Fibre Channel Class 2 (connectionless, acknowledged) and Class 3 (connectionless, unacknowledged) service between any ports.

As a Fabric element, SSP 101 ports are generic to common Fibre Channel port types, for example, F_Port, FL_Port and E_Port. In other words, depending upon what it is attached to, each GL port can function as any type of switch port. Also, the GL port may function as a special port useful in Fabric element linking, as described below.

In another aspect, SSP 101 is a multi-port network node element in a SAN (e.g., in a Fibre Channel based network, physical ports function as Nx_Ports). As a node element, SSP 101 may originate or respond to network communication (e.g., in a Fibre Channel based network, originate or respond to an exchange).

SSP 101 may support both switch ports and node ports simultaneously. The node ports may be supported directly at a physical interface (not shown) or indirectly as a virtual entity that may be reached via one or more of the physical interfaces (not shown) operating as switch ports. For the latter, these virtual node ports are visible to other network elements as if they were physically attached to switch ports on SSP 101.

SSP 101 supports plural upper level protocols, such as SCSI. In the case of SCSI on Fibre Channel (FCP), SSP 101 supports SCSI operation on any of its Nx_Ports. Each SCSI port can support either initiator or target mode operation, or both.

Figure 1B:
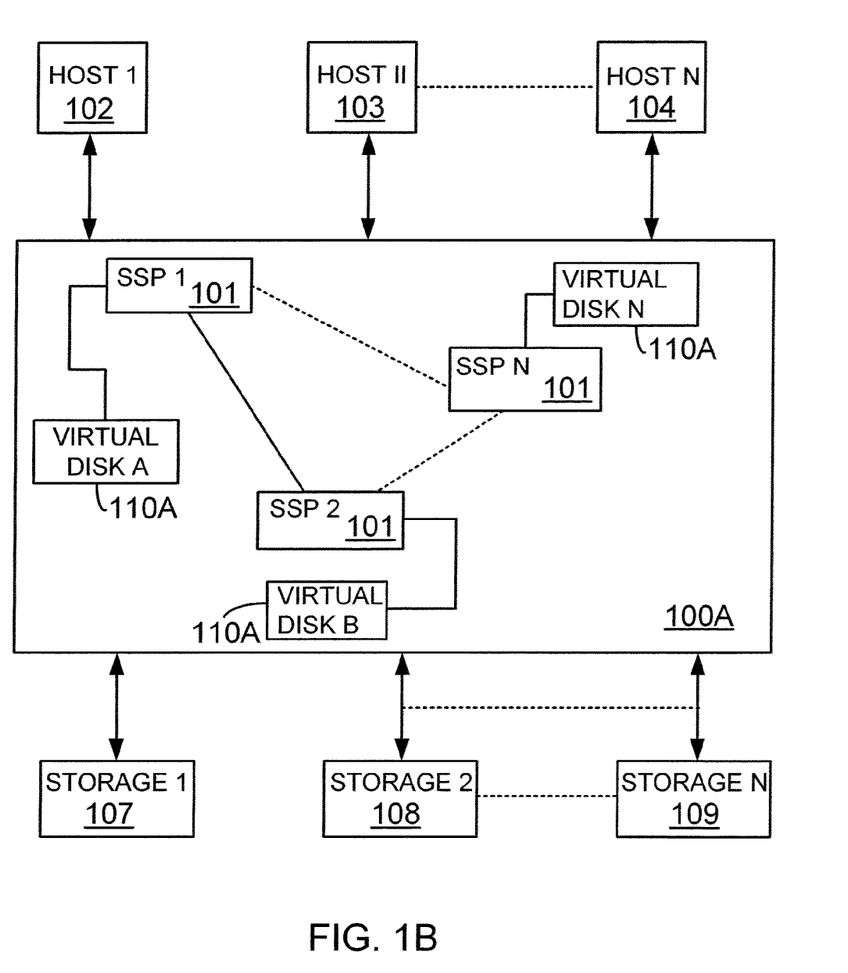
FIG. 1B shows another example of a system using storage virtualization.

FIG. 1B shows a block diagram of a network system where plural SSPs 101 ($SSP_1 \ldots SSP_N$) are operationally coupled in a cluster 100A. Each SSP 101 provides virtualization services to different host systems and storage devices. For example, SSP 1 101 provides virtual disk A (110A) (referred to as virtual storage earlier) to host 102, while SSP N provides virtual disk N (110A) to Host 104.

Figure 1C:
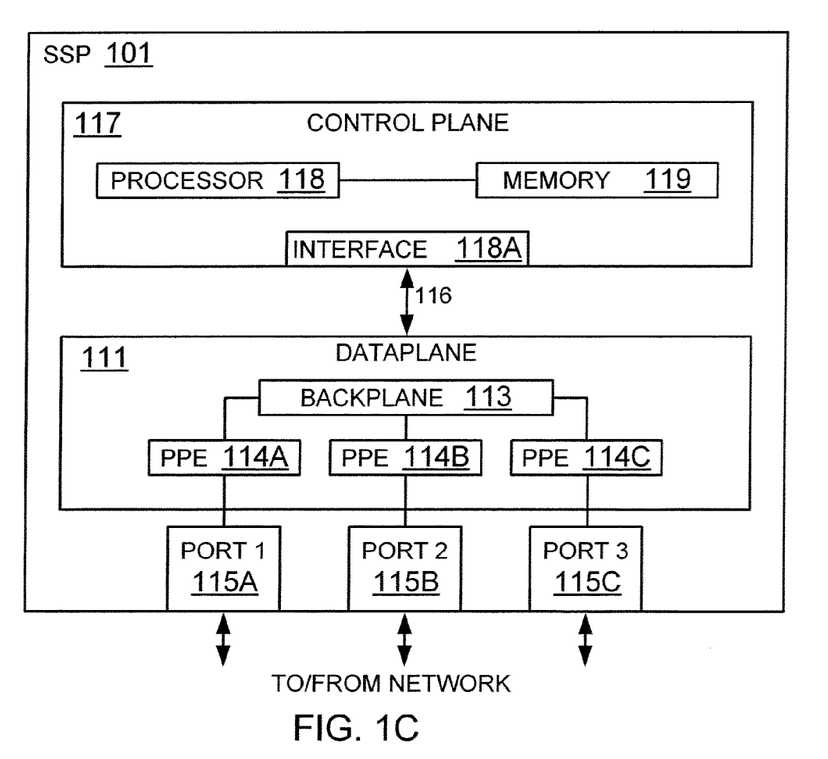
FIG. 1C shows a block diagram of a network node, according to one embodiment.

FIG. 1C shows a top-level block diagram of SSP 101. SSP 101 has plural ports (shown as Port 1-Port N (115A, 115B and 115C). The ports allow SSP 101 to connect with host systems and other devices including storage devices, either directly or via a SAN.

SSP 101 includes a data plane (module/component) 111 and a control plane (module/component) 117. Data plane 111 and control plane 117 communicate via control path 116. Control path 116 is a logical communication path that may consist of one or more physical interconnects. In one aspect, control path 116 includes a high speed PCI/PCI-X/PCI-Express bus. In another aspect, control path 116 includes a Fibre Channel connection. It is noteworthy that the adaptive aspects of the present invention are not limited to the type of link 116.

Data plane 111 includes memory (not shown), a backplane 113, plural ports (115A-115C) and plural packet processing engines (PPEs) (shown as 114A-114C). Data plane 111 receives network packets (e.g., command frames, data frames) from host system 102 via plurals ports (115A-115C). PPE (114A-114C) analyzes and modifies network packets, if needed, (e.g., modifying I_T_L and/or logical block address (LBA) for virtualization), and then forwards the packets to their next destination. I_T_Ls are used to process SCSI based commands, where I stands for initiator; T for a target and L for a logical unit number value.

PPEs (114A-114C) may forward packets via any Port 115A-115C by sending them through backplane 113. For example, commands that are autonomously processed by data plane 111, without assistance from control plane 117 are sent directly through back plane 113.

PPEs 114A-114C may also forward packets to control plane 117 via control path 116. For example, commands, which require assistance from control plane 117, are sent via control path 116.

Control plane 117 includes processor 118, memory 119 and a data plane interface 118A. Data plane interface 118A facilitates communication with data plane 113 via control path 116 for example, for sending/receiving commands. In one aspect, data plane interface 118A may include a network adapter, such as a Fibre Channel host bus adapter (HBA). In another aspect, data plane interface 118A includes a bus interface, such as a PCI bridge.

Processor 118 may be a generic microprocessor (for example, Intel® Xeon®)) and an associated chip set (e.g., Intel E7500), a reduced instruction set computer (RISC) or a state machine. Processor 118 executes software for processing input/output (I/O) requests and processing virtual commands.

The following provides an example of processing a virtual command. For example, when host 102 sends a command to write to virtual storage 110A, it is considered a virtual command, since it involves a virtual entity 110A. A physical command involves actual physical entities. The I/O context for the virtual command (i.e. remapped directly to a single corresponding physical command) specifies an association between the "I_T_L_Q" of the virtual command and of the actual physical commands. The "Q" in I_T_L_Q identifies the command type.

SSP 101 provides various storage related services, including, mirroring, snapshots (including copy on write (COW), journaling and others. The term mirror as used herein includes creating an exact copy of disk data written in real time to a secondary array or disk.

The term snapshot means a "point-in-time" copy of block level data. Snapshots are used to restore data accesses to a known good point in time if data corruption subsequently occurs or to preserve an image for non-disruptive tape backup. The term "COW" means copying only that data that has been modified after an initial snapshot has been taken. The term journaling as used herein means an operation that maintains a list of storage writes in a log file.

Metadata for the foregoing operations changes dynamically. The adaptive aspects disclosed herein provide an efficient system and method to manage metadata, as described below.

Figure 1D:
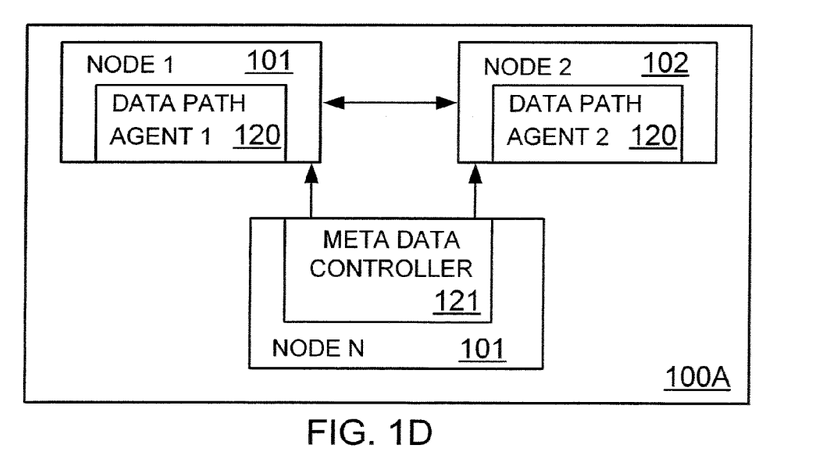
FIG. 1D shows a block diagram of a cluster, according to one embodiment.

FIG. 1D shows an example of a system for managing metadata, according to one embodiment. Cluster 100A includes various nodes (SSPs). For example, Nodes 1, 2 and N. Nodes 1 and 2 include a data path agent (DPA) 120 (shown as DPA 1 and DPA 2). Each DPA includes software instructions that are executed by processor 118. DPA 120 provides virtualization services for a plurality of host systems, for example, volume management, data replication, data protection and others.

Node N includes a metadata controller (MDC) 121 for cluster 100A. MDC 121 coordinates actions of all DPAs in different nodes and manages metadata. MDC 121 controls allocation of chunks that are used for persistent storage of metadata, as described below, according to one aspect. The term "chunk" as used herein is persistent storage that is used to store metadata and replicated data. Although Node N shows MDC 121, it also runs a DPA (not shown), i.e. at any given time, all nodes execute a DPA, while one of the nodes executes MDC 121.

Figure 1E:
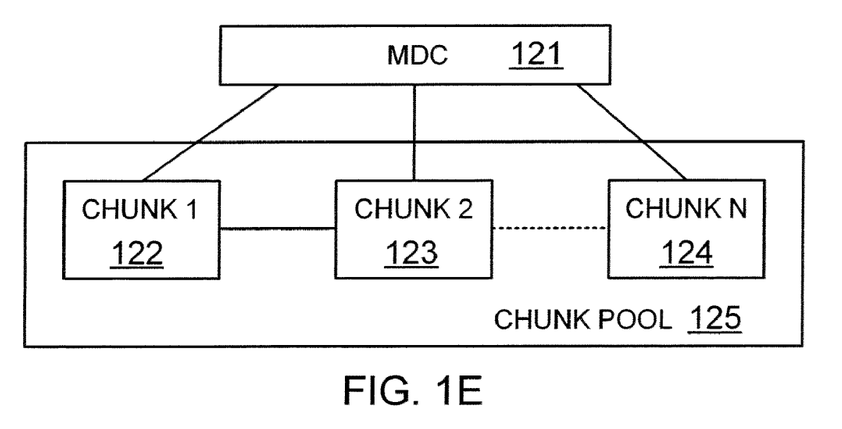
FIG. 1E shows a block diagram of "chunk" pool controlled by a centralized metadata controller, according to one embodiment.

FIG. 1E shows a chunk pool 125 with plural chunks 122, 123 and 124. MDC 121 allocates these chunks to DPAs and once a DPA completes writing metadata in the chunk, MDC 121 regains control back from the DPA. If the DPA fails while the chunk is being written, MDC 121 regains control back, even before the entire chunk is written, as described below. It is noteworthy that chunk pool 125 may change statically or dynamically. Furthermore, chunks may not be pre-allocated and instead MDC 121 is aware of available chunk storage and may use a dynamic allocation process to retrieve a chunk when needed.

Figure 2A:
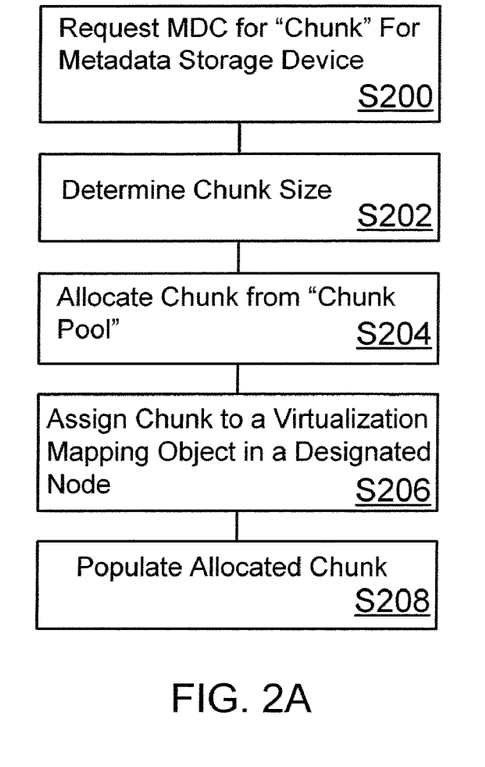
FIGS. 2A and 2B show process flow diagrams for managing chunks, according to one embodiment.

FIG. 2A shows a process flow diagram for managing metadata chunks, according to one embodiment. The process starts in step S200, when a DPA (for example, 120) requests a chunk from MDC 121 for metadata storage services. In step S202, MDC 121 examines the request from DPA 120 and determines the chunk size that it needs to allocate.

In step S204, MDC 121 allocates a chunk to the request from the chunk pool, for example the chunk pool 125 (FIG. 1E). Steps S202 and S204 are executed as a part of the same transaction, i.e., either both happen or neither step takes place.

In step S206, the chunk is assigned to a virtualization-mapping object in a designated node. Virtual disks are composed of a hierarchical layering of mapping objects. Each mapping object represents a particular transformation of an I/O operation. Each mapping object contains metadata that directs the transformation of individual I/Os.

In step S208, DPA 120 for the designated node gets control of the chunk and DPA 120 populates the chunk with metadata.

Figure 2B:
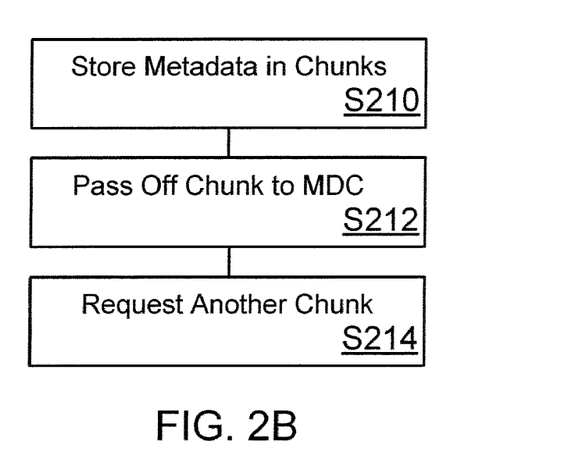

FIG. 2B shows a process flow diagram for storing metadata in chunks, according to one embodiment. The process starts in step S210, when a DPA (for example, 120) that gets control of a chunk stores metadata in the assigned chunk.

The following provides examples of metadata that may be used by the various embodiments: (a) "Physical storage container (PSC)"—metadata for this example is an initiator port on an SSP 101, a remote target port, a LUN identifier, and a logical block address (LBA) offset value; (b) Segment map—metadata for this example is a table of fixed size segments, each of which maps a virtual LBA region to an underlying mapping object; (c) Point-in-time: metadata in this example includes a table of fixed size segments, managed by an application to manage COW operations.

After DPA 120 has stored the metadata, control regarding the chunk is passed to MDC 121 in step S212. Thereafter, DPA 120 requests another chunk from MDC 121 in step S214.

Figure 2C:
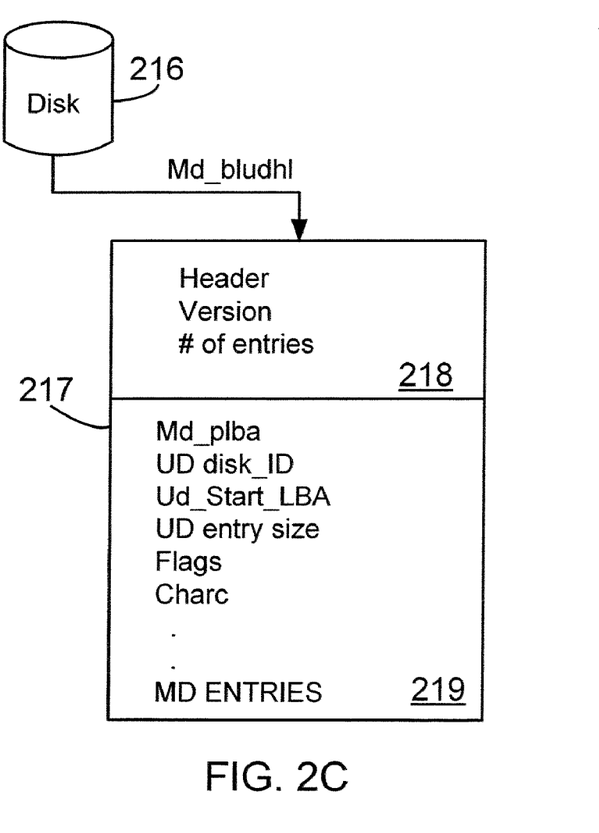
FIG. 2C shows an example of metadata.

FIG. 2C shows an example of metadata 217 for a segment in disk 216. Metadata 217 includes header and version number 218 and is identified as md-bluhdl. Metadata 217 includes various metadata entries (MD entries 219) for example, md_plba (logical block address); UD disk_ID (user data (UD) identifier); UD StartLBA (start of user data LBA); UD size (size of each UD entry); flags; characters and then other metadata entries. The following shows a computer code representation for metadata:

```
typedef struct dpa_chunk {
    uint32_t version;
    uint32_t num_entries;
```

```
dpa_objhdl_t md_bluhdl;
dpa_lba_t md_plba;
dpa_objhdl_t ud_bluhdl;
dpa_lba_t ud_plba;
uint32_t ud_size;
uint32_t checkdata;
dpa_chunkmd_t *mdentries;
} dpa_chunk_t;
typedef struct dpa_chunkmd {
dpa_lba_t vlba;
dpa_checkmode_t checkmode;
uint32_t checkdata;
} dpa_chunkmd_t;
```

Figure 3:
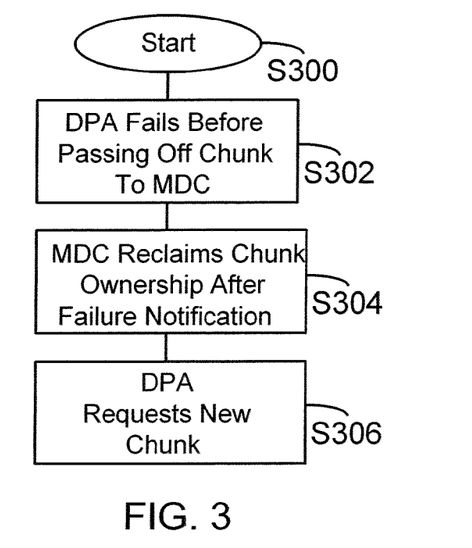
FIG. 3 shows a process flow diagram for obtaining control of a chunk, according to one embodiment.

FIG. 3 shows a process flow diagram for managing chunks when a DPA fails before passing off a chunk to MDC 121, according to one embodiment. The process starts in step S300. In step S302, a DPA fails before passing off a chunk to MDC 121. In step S304, MDC 121 reclaims the control of the allocated chunk, after MDC 121 receives notification of DPA failure. Thereafter, in step S306, when the DPA recovers, it requests another chunk from MDC 121.

Figure 4:
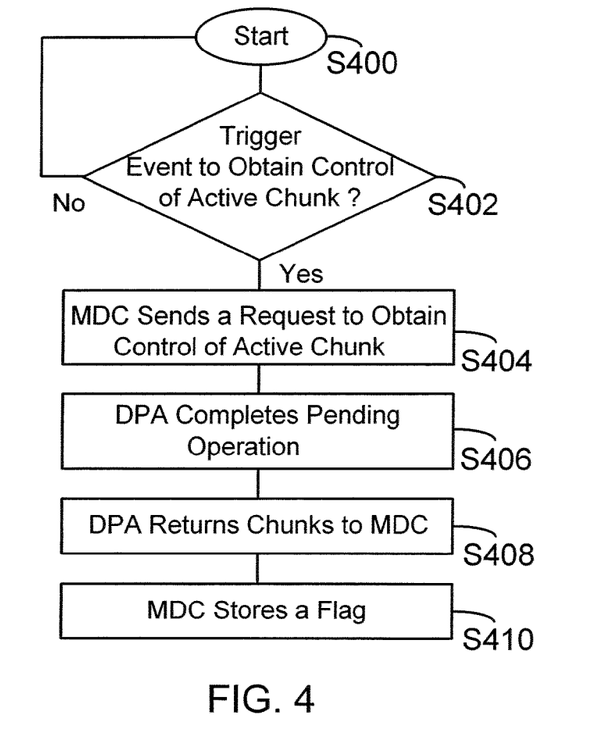
FIG. 4 shows a process flow diagram for gaining control of an active chunk, according to one embodiment.

FIG. 4 shows a process flow diagram for obtaining control of a chunk, according to one embodiment. The process starts in step S400. In step S402, MDC 121 determines if there is a trigger event to gain control of a chunk from a DPA to MDC 121. In one embodiment, the trigger event my be generated from a user action, for example, creation of a new Point-In-Time copy. If there is no trigger event, the process simply continues to monitor. If yes, then in step S404, MDC 121 sends a request to obtain control of an active chunk. An active chunk is a chunk that at any given time is under control of a DPA and is being written by the DPA.

In step S406, the DPA completes the pending operation and in step S408, the DPA returns control of the chunk to MDC 121. In step S410, MDC 121 stores a flag indicating that it "owns" (i.e. controls) the chunk.

The foregoing embodiments have various advantages. For example, MDC 121 is not aware of any metadata format and simply allocates chunks before the chunk is populated by a DPA. In another aspect, if a DPA fails for whatever reason, MDC 121 obtains control of the chunk.

Although the present invention has been described with reference to specific embodiments, these embodiments are illustrative only and not limiting. Many other applications and embodiments of the present invention will be apparent in light of this disclosure and the following claims.

What is claimed is:

1. A method comprising:
providing a cluster of a plurality of storage platforms that are operationally coupled to a plurality of storage devices and to a plurality of client computing systems;
wherein each storage platform presents virtual storage to a client computing system and appears as a virtual computing system to a storage device for providing virtualization services to the client computing system and the storage device; and
wherein one of the storage platforms includes a centralized metadata controller for managing metadata for the plurality of storage platforms;
a data processing agent operating in another of the storage platforms requesting a memory chunk for storing metadata;
the centralized metadata controller for the plurality of storage platforms operating in the one of the storage platforms receiving the request for the memory chunk;
the centralized metadata controller determining the memory chunk size and allocating the memory chunk from a pool of memory chunks managed by the centralized metadata controller;
the centralized metadata controller assigning the allocated memory chunk to a virtualization mapping object of the storage platform executing the data processing agent that requested the memory chunk; and
the data processing agent of the another storage platform obtains control of the allocated memory chunk and populates the memory chunk with metadata.

2. The method of claim 1, wherein the data processing agent of the another storage platform passes control of the memory chunk to the metadata controller after the data processing agent has completed storing the metadata.

3. The method of claim 1, wherein if the data processing agent fails before passing off control of the memory chunk to the metadata controller then the metadata controller reclaims control of the memory chunk.

4. The method of claim 3, wherein the metadata controller stores the memory chunk after reclaiming control.

5. A storage area network, comprising:
a plurality of virtualization modules that are coupled together in a cluster;
wherein the plurality of virtualization modules are operationally coupled to a plurality of storage devices and to a plurality of client computing systems, and each virtualization module presents virtual storage to a client computing system and appears as a virtual computing system to a storage device for providing virtualization services to the client computing system and the storage device; and
wherein each virtualization module runs a data processing agent for providing the virtualization services, and one of the virtualization modules runs a centralized metadata controller for the cluster that controls allocation of memory chunks to store metadata; and
wherein the metadata controller receives a request for a memory chunk from the data processing agent of another one of the virtualization modules, determines the memory chunk size, allocates the memory chunk from a pool of memory chunks, and assigns the allocated memory chunk to a virtualization mapping object of the another virtualization module; and
wherein the data processing agent of the another virtualization module gets control of the allocated memory chunk and populates the memory chunk with the metadata.

6. The storage area network of claim 5, wherein the data processing agent of the another virtualization module passes control of the memory chunk to the metadata controller after the data processing agent has completed storing the metadata.

7. The storage area network of claim 6, wherein if the data processing agent fails before passing off control of the memory chunk to the metadata controller then the metadata controller reclaims control of the memory chunk.

8. The storage area network of claim 7, wherein the metadata controller stores the memory chunk after reclaiming control.

9. A virtualization module coupled to other virtualization modules in a cluster, comprising:
a data processing agent executed by each of the virtualization modules for providing virtualization services;
wherein the plurality of virtualization modules are operationally coupled to a plurality of storage devices and to a plurality of client computing systems, and each virtualization module presents virtual storage to a client computing system and appears as a virtual computing system to a storage device for providing the virtualization services to the client computing system and the storage device; and a centralized metadata controller for the cluster that runs in one of the virtualization modules and controls allocation of memory chunks to store metadata; and the metadata controller receives a request for a memory chunk from the data processing agent of another one of the virtualization modules, determines the memory chunk size, allocates the memory chunk from a pool of memory chunks, and assigns the allocated memory chunk to a virtualization mapping object of the another virtualization module; and wherein the data processing agent of the another virtualization module gets control of the allocated memory chunk and populates the memory chunk with the metadata.

10. The virtualization module of claim 9, wherein the data processing agent passes control of the memory chunk to the metadata controller after the data processing agent has completed storing the metadata.

11. The virtualization module of claim 10, wherein if the data processing agent fails before passing off control of the memory chunk to the metadata controller then the metadata controller reclaims control of the memory chunk.

12. The virtualization module of claim 11, wherein the metadata controller stores the memory chunk after reclaiming control.

* * * * *

UNITED STATES PATENT AND TRADEMARK OFFICE
CERTIFICATE OF CORRECTION

PATENT NO.         : 8,185,715 B1
APPLICATION NO.    : 11/694698
DATED              : May 22, 2012
INVENTOR(S)        : William W. Chow et al.

Page 1 of 1

It is certified that error appears in the above-identified patent and that said Letters Patent is hereby corrected as shown below:

In column 4, lines 4-5, delete "N ports." and insert -- N_ports. --, therefor.

In column 5, line 36, delete "and of" and insert -- and I_T_L_Q of --, therefor.

Signed and Sealed this
Seventh Day of August, 2012

David J. Kappos
*Director of the United States Patent and Trademark Office*